United States Patent
Crosbie et al.

(10) Patent No.: US 7,007,301 B2
(45) Date of Patent: *Feb. 28, 2006

(54) COMPUTER ARCHITECTURE FOR AN INTRUSION DETECTION SYSTEM

(75) Inventors: Mark Crosbie, San Jose, CA (US); Rosemarie Shepley, El Granada, CA (US); Benjamin Kuperman, West Lafayette, IN (US); Leonard L. Frayman, Redondo Beach, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 858 days.

This patent is subject to a terminal disclaimer.

(21) Appl. No.: 09/878,320

(22) Filed: Jun. 12, 2001

(65) Prior Publication Data

US 2002/0083343 A1 Jun. 27, 2002

Related U.S. Application Data

(60) Provisional application No. 60/210,922, filed on Jun. 12, 2000.

(51) Int. Cl.
*G06F 12/14* (2006.01)

(52) U.S. Cl. .................. 726/23; 713/201; 709/224; 707/205

(58) Field of Classification Search ................ 713/201; 709/225; 707/205
See application file for complete search history.

(56) References Cited

U.S. PATENT DOCUMENTS

| | | | | |
|---|---|---|---|---|
| 5,896,499 A | * | 4/1999 | McKelvey | 713/201 |
| 5,991,881 A | * | 11/1999 | Conklin et al. | 713/201 |
| 6,119,170 A | * | 9/2000 | Schoffelman et al. | 709/244 |
| 6,304,973 B1 | * | 10/2001 | Williams | 713/201 |
| 6,321,338 B1 | * | 11/2001 | Porras et al. | 713/201 |
| 6,647,400 B1 | * | 11/2003 | Moran | 707/205 |

* cited by examiner

*Primary Examiner*—Ayaz Sheikh
*Assistant Examiner*—Pramila Parthasarathy

(57) ABSTRACT

The present application is directed to a host-based IDS on an HP-UX intrusion detection system that enhances local host-level security within the network. It should be understood that the present invention is also usable on, for example, Eglinux, solaris, aix windows 2000 operating systems. It does this by automatically monitoring each configured host system within the network for possible signs of unwanted and potentially damaging intrusions. If successful, such intrusions could lead to the loss of availability of key systems or could compromise system integrity.

19 Claims, 5 Drawing Sheets

US 7,007,301 B2

COMPUTER ARCHITECTURE FOR AN INTRUSION DETECTION SYSTEM

RELATED APPLICATION

The present application claims priority of U.S. Provisional Application Ser. No. 60/210,922, filed Jun. 12, 2000, entitled "SYSTEM AND METHOD FOR HOST AND NETWORK BASED INTRUSION DETECTION AND RESPONSE", the disclosure of which is incorporated by reference herein in its entirety.

The present application is related to patent application entitled "SYSTEM AND METHOD FOR HOST AND NETWORK BASED INTRUSION DETECTION AND RESPONSE" and assigned to the instant assignee and filed on even date herewith and is hereby incorporated by reference into this specification in its entirety.

FIELD OF THE INVENTION

The present invention relates generally to intrusion detection, and more particularly, to a host-based Intrusion Detection System (IDS). Intrusion detection is a process of monitoring events occurring in a computer system or network and analyzing the events for signs of security violations.

BACKGROUND OF THE INVENTION

Intrusion detection systems can be applied at many levels in an enterprise environment: to protect host systems from exploits of known vulnerabilities, to protect from attacks coming in from the network (from outside the firewall or from within), to protect against security policy violations within a system or enterprise, and even to protect some applications. Currently, IDS comes in two types:
 1) "Network-based" IDS, and
 2) "Host-based" IDS.

Network-based IDS's function inside a monitored network and monitor network packets searching for patterns of activity indicative of an attack on the network or probing/attacking of systems from outside the firewall. Examples of such attacks include: "Ping of Death", SYN flooding, "winnuke"—an attack on Windows NT systems and various denial-of-service attacks. This type of IDS can run on local host systems that have (a lot of) bandwidth to spare, or (conveniently for the IDS vendors) they can be packaged and sold as a dedicated systems that monitor network activity "in the background" without adding overhead to the production system.

Properties of network-based intrusion detection are:
 Observes network packets in a dedicated IDS system attached to LAN
 Collect router and gateway data
 Protects against a variety of network attacks
 Lacks host contextual information.
 Is easier to implement than host-based IDS
 Plays to over-hyped "outsider" attacks.

Host-based IDS on the other hand reside and execute on the system being protected. Although host-based IDS incurs some overhead penalty on protection systems, the host-based IDS can provide significantly better protection because the host-based IDS can monitor low level system activity and thereby detect misuse/intrusions activities that are impossible to detect from the network. Host-based IDS is also capable of detecting misuse/intrusions by users directly logged on to the system who are not even using the network. In addition, all network-based misuse/attacks can also be detected by a host-based IDS.

System misuse (attacks) that can be detected by the host-based IDS but which are impossible to detect from the network are those that exploit system vulnerabilities to obtain elevated privilege: buffer overflow attacks, symlink exploits, setgid root, modifying or moving system binary files, etc.

By monitoring low-level system activity, less knowledge is required about the wide variety of attack scenarios employed by hackers. This is because many attack scenarios exploit the same basic system vulnerabilities. Low-level activity monitoring requires only that activity patterns exploiting these few vulnerabilities be detected, instead of requiring activity checks against a vast library of "attack pattern scenarios" that must be updated whenever a new scenario discovered.

A number of technologies have emerged as potential solutions to the various security problems faced by companies. Firewalls, encryption, and security auditing tools are useful in the world of security. A firewall is a system that is placed between two networks that controls what traffic is allowed between those networks. A firewall is usually placed between the Internet and the internal intranet. It can be viewed as a useful point of policy enforcement through which you can decide what network traffic is and is not permitted to and from the organization. When deployed correctly (itself a difficult task in a complex business environment), a firewall is an efficient tool to prevent attacks on the critical systems and data. However, a firewall connected to the Internet cannot protect the user against an attack against the systems launched from inside the organization. Often the firewall cannot stop an attacker inside the organization from attacking systems on the Internet.

A further complication in deploying a firewall is that it is difficult to establish clearly where the boundary exists between inside and outside. At one time it was obvious that the Internet was outside and the intranet was inside. However, more and more corporations are joining their intranets in multiple-partner arrangements, often termed extranets. A firewall becomes difficult to deploy in an extranet environment; if inside and outside have been joined together, where can you draw the line and place the firewall? In such an environment, some form of continuous security monitoring tool is needed to ensure that critical systems are not being abused and valuable data is not being pilfered by the so-called partners.

Encryption is a mathematical technique that prevents the unauthorized reading and modification of data. It does this in such a way that the intended recipients of the data can read it but no intermediate recipient can read or alter the data. It also allows authentication of the sender of a message—is the claimed sender really the person who sent the message? In any well-designed cryptographic system, the heart of the security is the key which is used to encrypt the message. Knowing the key allows you to decrypt any message, alter it, and retransmit it to the sender. Even if the inner workings of the encryption software are known completely, without knowing the key you cannot read or alter messages.

The problem with relying on encryption lies in the old adage a chain is only as strong as its weakest link. In this case, the weakest link is not the encryption technology but the systems on which the key is stored. After all, how can you be sure the program you are using to encrypt the data has not saved the key to a temporary file on the disk, from which an attacker can later retrieve it? If attackers gain access to the key, not only can they decrypt the data, they can impersonate you and send messages claiming to be signed only by you.

Encryption does not protect the data while it is in the clear (not encrypted) as you process it (for example, preparing a document for printing). Moreover, encryption cannot protect the systems against denial of service attacks. So despite the advantages in the space of privacy and authentication that encryption brings, it is still only part of an overall security solution. A security auditing tool probes the systems and networks for potential vulnerabilities that an attacker could exploit, and generates a report identifying holes and recommending fixes. Of course, the assumption is that once you find the holes, you will quickly patch them before they are exploited. If used in this fashion, and run regularly, a security auditing tool can be a very valuable weapon against attackers.

But how regularly should you run the tool? Attacks can occur at any point in the day; an attacker can penetrate the systems, cover up his or her tracks, and install a variety of backdoors all within a matter of minutes. Running the tools every hour gives attackers a very large window of opportunity to exploit the systems, steal the data, and cover their tracks before you ever detect them. It is obvious that if some form of continuously running security audit tool were available, life would be much simpler and the systems more secure. This brings us to the need for an Intrusion Detection System.

The amount of information that flows through a typical corporate intranet and the level of activity on most corporate servers make it impossible for any one person to continually monitor them by hand. Traditional network management and system monitoring tools do not address the issue of helping to ensure that systems are not misused and abused. Nor can they help detect theft of a company's critical data from important servers. The potential impact of computer-based crime is significant to most corporations: their entire intellectual property often resides on server machines. A tool that could detect security-related threats and attacks as they occur would significantly ease the burden that most network administrators face.

The current market perception is that network-based intrusion detection systems are the more important, probably because of the current media and market focus on hackers breaking into systems from the Internet (from outside the firewall). More importantly, this perception is being sustained by current IDS vendors because Network-based IDS is easier to do and easier to package.

However, statistics provided by the FBI have shown that the major portion of computer security break-ins are done by insiders and from inside the Intranet firewalls: the greater threat is the insider attack. In short, most threats come from within the enterprise and firewalls cannot prevent attacks from within. Some statistics are worth noting:

30% of all Internet break-ins occurred despite the presence of a firewall. Source: Fortune Magazine, February 1997.

32% of the losses were due to internal hackers. Source: 1996 Information Week/Ernst & Young Information Security Survey.

Total 1996 estimated damage in dollars from security break-ins: $10 billion. Source: FBI.

78% of the companies surveyed reported losing money through security breaches. Source: FBI and the Computer Security Institute Reasons given for not reporting a known break-in:

75% wanted to avoid negative publicity.

72% felt that a competitor would use this info against them.

53% were unaware that they could report such a crime.

60% decided that a civil remedy was better.

Source: 1996 Computer Security Institute/FBI Computer Crime and Security Survey.

Firewalls cannot detect or prevent attacks on enterprise systems from within the Intranet. The challenge is to know when systems have been compromised from within. Many inside attacks can not be prevented, but can be detected as abnormal system activity by host-based intrusion detection.

When a security system has failed, it is important to be notified of that fact as soon as possible. A crude form of intrusion detection could be the daily or weekly audit-log review, searching for inappropriate system activity. The difficulties with this approach are:

1) Even with an effective, disciplined daily review the successful hacker could have up to 24 hours of free reign inside the systems before being detected, and any damage that might have been done might not be discovered for a long time thereafter.

2) No human review process can be as effective and disciplined as necessary in order to provide even this poor level of protection.

3) Audit logs are very large and a person may not detect patterns of misuse spanning many entries.

4) Reviewing audit logs is the kind of work a machine should do.

Misuse of a system is a difficult term to define, but may be loosely described as any action that attempts to undermine the data protection, access control or user authentication mechanisms on a system. An attacker may be an outsider attempting to gain access to certain systems, but more often than not is an insider using specialized knowledge to subvert security controls on a system.

Financial institutions are very sensitive to the damage a single rogue individual in a point of trust can do. A similar threat exists in the electronic sphere. Every day billions of dollars are transferred around the world over computer networks. Increased connectivity and the use of the Internet have increased the exposure to subversion faced by financial institutions. As more and more banks offer bank-at-home facilities via the Web, the risk of a customer's financial information being intercepted grows dramatically.

When most people think of theft, they initially think of financial theft. However, a far more damaging form is theft of intellectual property. Intellectual property refers to what it is that only you know that allows you to outsmart the competitors. The intellectual property could be the design of a new engine, the code to the latest product, or even the customer contact list. If this information got into the hands of the competitors, it would seriously damage the business. The threat to intellectual property is keenly felt by companies worldwide and any technology that can reduce the risk of information falling into the wrong hands is very valuable.

Information is of no use if it cannot be acted upon, and not having the computing resources available to process information renders it useless. Any company that offers its customers an online service is acutely aware of the potential losses that can result from even a minute of downtime. This is especially true in the case of web pages. Lack of availability of critical computing resources because of malicious actions is a serious threat faced by any company doing business on the Internet today: the loss of business (measured in dollars) can be significant. Harder to quantify, but more damaging in the long term, is the loss of consumer confidence in a business that suffered an online attack.

Another example of a loss of a critical computing resource is a corporate e-mail system crash. When the outage is caused intentionally by an attacker who is continually disrupting business, the financial cost to a company can be very high—lost sales or miscommunication with customers, for example.

There are real concerns about privacy, for example, in the medical, insurance and banking fields. If a computer system is broken into by an outside attacker, personally sensitive data may be obtained that could leave you liable to legal action because of a lack of due diligence on the part to protect sensitive data.

Most perpetrators often are not nefarious hackers who roam the Internet, but the very own employees, whom you trust with the critical data and systems. Disgruntled employees who have an intimate knowledge of the systems and network are far more likely to abuse their positions of trust. However, most effort has been expended in defending against the perceived threat from outside. As a result, most security solutions have focused on firewalls and web servers, completely ignoring the serious problem that comes from within. Industrial corporate espionage is also a significant threat to companies, especially in foreign countries.

The following show the circumstances that leas to the vast bulk of security problems.

Misplaced Trust

When you access a company's web page, you are trusting that it really is the company's web page you are viewing and not some interloper pretending to be that company. When you download product data from it, you are trusting that it is accurate and correct. When you order their product, you are trusting that the order information is being kept confidential. When you receive e-mail, you trust that the person identified as the sender really did send you the e-mail. When you type the password into a program, you are entrusting that its designers did not include code to save the passwords so they can break into the system at a later date. In each of these examples, the trust can be misplaced.

Computer viruses are the single biggest cause of lost productivity in a business environment. The real cost of viruses is not the damage they cause, but the total cost of cleanup to ensure that the infection has not spread to other computers. Moreover, Java and ActiveX permit the downloading of executable code from the Internet without any assurances as to its real purpose. There are many examples of Web pages that contain ActiveX or Java applets that will steal a file from the hard drive.

As the saying goes, "A chain is only as strong as its weakest link." There is no point in investing in a complex security solution if there is a simple backdoor around it. For example, one router vendor recently had a problem whereby all of their boxes shipped with a default password that was easy to guess. Most administrators forgot to change the password. Despite investing many hours in correctly configuring the routers for secure operation, their security could be defeated in seconds by an attacker who knew the password.

As more business is done over the Internet, more trust is placed in critical infrastructure elements: the routers, hubs, and Web servers that move data around the net. They also include DNS name servers that allow users to access www-.mycompany.com from their browsers. A DNS server is a computer that maps names such as www.company.com to an Internet address such as 10.2.3.4. By attacking these important infrastructure services, a hacker can bring the whole organization to its knees. Sometimes an attacker does not have to steal information. By simply making the systems unavailable for use the attacker can cause you losses in both financial terms and in credibility in the industry.

It may seem obvious, but if you misconfigure a critical piece of software or hardware, you can open your self up to many security problems. This is a particular problem in the area of firewalls, where configuration rules are complex—one missed rule can leave the whole internal network open to attack. Another example is a network where the system administrator has not taken the time to put some simple security measures in place.

Code that runs with privilege (as root on UNIX systems, or as Administrator on Windows NT systems) is particularly vulnerable because a simple bug can have major impact. Most security problems are found in code that runs with privilege that is poorly designed. Moreover, most code runs with more privilege than it needs to accomplish its task. Often a site will install its Web server to run as root, granting it far greater privilege than it needs to simply serve up Web pages and CGI scripts. A Web server running as root is a prime target for an attacker—exploiting CGI script vulnerability can gain the attacker full root privileges on the systems.

In summary, although host-based systems have numerous advantages as compared to network based systems, the difficulty is that prior art host-based systems require traditional signature matching against hundreds of templates. Up until now there have not been any effective host-based IDS systems. Thus, a need exists for an efficient host-based intrusion detection system.

SUMMARY OF THE INVENTION

It is therefore an object of the present invention to provide a host-based intrusion detection system that observes kernel audit data, network packets and system log files on target host.

Another object of the present invention is to provide a host-based intrusion detection system that provides more accurate determinations (fewer false positives, fewer missed attacks).

Yet another object of the present invention is to provide a host-based intrusion detection system that detects building blocks of attacks, not a variety of attack scenarios that may require frequent update.

Still another object of the present invention is to provide a host-based intrusion detection system that detects insider attacks that do not use the network. Network traffic encryption has no impact.

In a first aspect of the present invention a computer architecture is provided for an intrusion detection system. The computer architecture includes a control agent to interface with a management system and to monitor system activity. At least one data gathering component gathers kernel audit data and syslog data. At least one correlator interprets and analyzes the kernel audit data and the syslog data using at least one detection template.

In another aspect of the present invention a computer architecture is provided for detecting intrusions. Reading means read kernel records. Reformatting means reformat each of the read kernel records into a different format. Parsing means parse the records and compare the parsed records against one or more templates.

In still another aspect of the present invention a computer system includes a processor and a memory coupled to the processor. The memory has stored therein sequences of instructions, which, when executed by the processor, causes the processor to perform the steps of reading kernel records, reformatting each of the read kernel records into a different format, parsing the records and comparing the parsed records against one or more templates.

The inventive host-based intrusion detection system operates by monitoring low level system activity for possible security breach. Unlike other IDS products, the host-based intrusion detection requires only a small handful of detection templates from which to capture hundreds of attack attempts. The host-based IDS monitors for fundamental system vulnerabilities instead of the traditional signature matching against the hundreds of known attacks. In addition, the host-based IDS operates in near real-time. All processing takes place on the system being protected so there is no need to send data to a central point for post-processing.

The present application is directed to a host-based IDS on an HP-UX intrusion detection system that enhances local host-level security within the network. It should be understood that the present invention is also usable on, for example, Eglinux, solaris, aix windows 2000 operating systems. It does this by automatically monitoring each configured host system within the network for possible signs of unwanted and potentially damaging intrusions. If successful, such intrusions could lead to the loss of availability of key systems or could compromise system integrity.

As a host-based IDS continuously examines ongoing activity on a system, it seeks out patterns of activities that might suggest security breaches or misuses. These might include, for example, a hacker attempting to break into or disrupt the system, subversive "insider" activities, or someone trying to spread a virus. Once a host-based IDS has been activated for a given host system, if it detects an intrusion attempt, an alert is issued to the administrative interface where you can immediately investigate the situation, and when necessary, take action against the intrusion. In addition, a local response to an alert can be undertaken.

The host-based IDS can even provide notification in the event of suspicious activity that might precede an attack. It is important to note that, in contrast, other intrusion detection systems which rely entirely on an operator-instigated analysis of system log files, typically performed at the end of a day, often allow a potential intruder considerable time to damage the system before being detected.

The host-based IDS is particularly useful for enterprise environments where centralized management tools control networks of heterogeneous systems. These environments include, for example, web servers, transaction processors, application servers, and database systems.

The host-based IDS uses knowledge about how host systems, the network, or the entire enterprise might be exploited and applies that expertise to the flow of system events. Many intrusions, while differing in their scenarios, re-use the same "building blocks" to exploit a wide variety of system vulnerabilities. As a result, the host-based IDS can use known building blocks to provide protection against both existing attack scenarios and even against some as of yet unknown scenarios.

The host-based IDS provides for simplified administration through a secure, management graphical user interface (GUI).

A host-based IDS provides an intrusion response capability by means of an automated response script that can be customized for the host that is being monitored.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
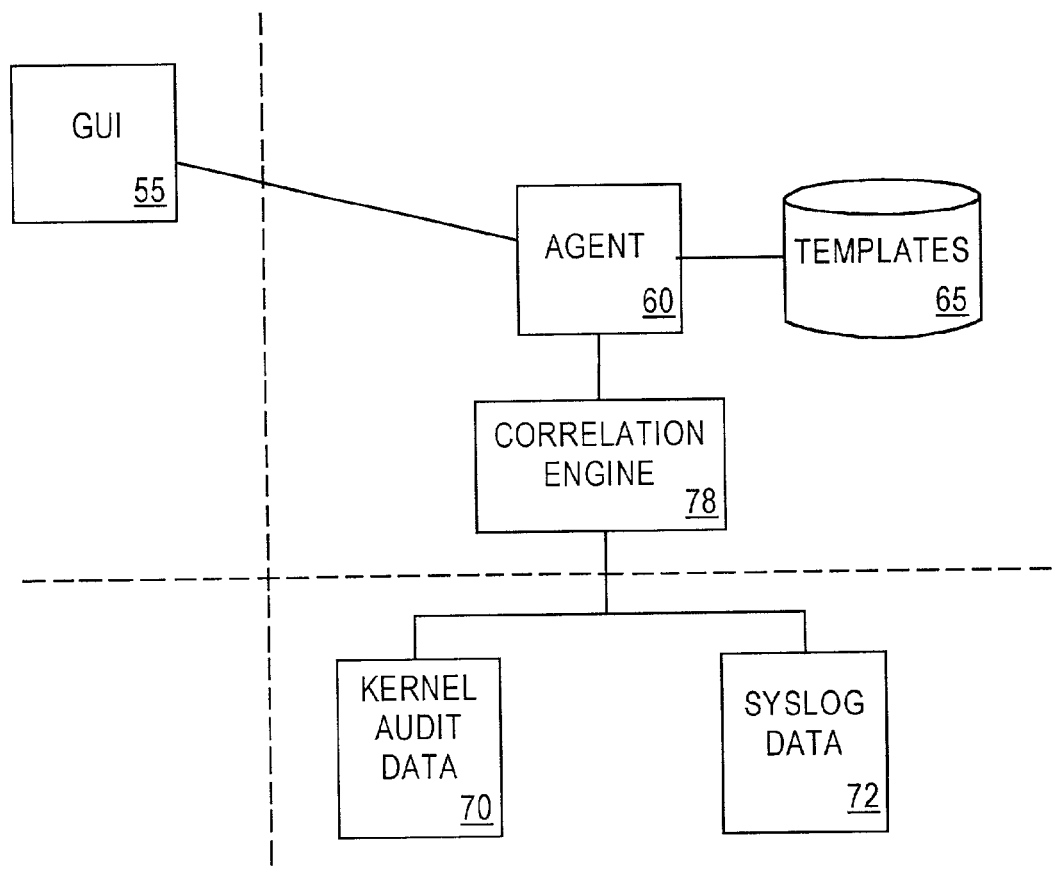
FIG. 1 is a high level illustration of the logical architecture according to the present invention.

The following definitions are provided:

Agent: The host-based IDS component that gathers system data, monitors system activity, and issues notifications upon detection of an intrusion.

Alert: Also referred to as a notification. A message sent by host-based IDS warning of a suspected or actual intrusion and usually calling for some sort of action in response. Typically, the alert is sent to a display window on the management component and logged as an entry to a log file.

Audit Data: Also referred to as a kernel audit data. The most detailed level of system data utilized by host-based IDS. As each system call is executed, its parameters and outcome are recorded in a log file. These records of system activity are used by host-based IDS for intrusion detection.

Console: Also referred to as the GUI. The administrative or management component of host-based IDS.

Correlator: This is the core component of host-based IDS. The correlator interprets and categorizes the data sources, correlates the information to known detection templates, and sends notification of any suspected intrusions to the administration or management console, or GUI.

Data Source: The host-based IDS requires data generated by the system to detect intrusions. A data source is such a generator of data. For example, the system log file (syslog) is a potential data source, as is kernel audit data.

Detection Template: Basic "building block" or pattern known to be used in security attacks on systems. It is knowledge of these characteristic types of unauthorized system activity that is used by host-based IDS when detecting security attacks.

GUI: A Graphical User Interface (GUI) through which the user controls the operations of host-based IDS and where notification of alerts occurs.

Host System: Also referred to as a node. This is one of the systems in the network that the user chose to monitor using host-based IDS.

Intrusion: Also referred to as an attack. A violation of system security policy by an unauthorized outsider or by an otherwise authorized user. A violation could include improperly accessing the network, accessing certain systems within the network, accessing certain files, or running certain programs.

Intrusion Detection System (IDS): An automated system that can detect a security violation on a system or a network.

Kernel: The core of the operating system. The kernel is the compiled code responsible for managing the computer's resources, such as memory, file system, and input/output.

Memory Mapped File: Interprocess communication mechanism used to send data between processes on the IDS such that it places very little overhead on the system.

Response Script: Once the host-based IDS detects an intrusive activity, the response script is executed on the machine which was attacked and then the IDS agent sends an alert to the management GUI. This script is passed the details of the alert, and can take whatever actions the system administrator requires.

SSL: Secure Sockets Layer (SSL) is a protocol for sending data across a network that prevents an eavesdropper from observing and/or modifying any data transmitted. SSL is used for all communication between agent nodes and the management GUI in the host-based IDS.

Surveillance Group: A way of grouping related detection templates. For example, all detection templates related to checking for file system intrusions might be grouped into a "File System" surveillance group.

Surveillance Schedule: A set of configurable surveillance groups to be deployed to one or more systems on a scheduled basis. A particular surveillance group is assigned to run on a given system at one or more particular times of day on one or more given days of the week.

Virus: A piece of code that when run attaches itself to ("infects") other programs, running again when those programs are run.

Vulnerability: A point at which a system can be subverted by an attacker. Vulnerabilities result from flaws in coding or design.

Referring now to FIG. 1, the host-based IDS 50 includes the following components.

A graphical user interface 55, or GUI, for administering the host-based IDS. The GUI allows the administrator to configure, control and monitor the host-based IDS system 50. Any intrusions actually detected are reported here as alerts.

A host-based agent 60. This is the component that gathers system data, monitors system activity, and issues notifications upon detection of an intrusion.

Detection templates 65. Most attacks exhibit a limited number of common patterns and similar steps. Therefore, once these patterns of activity are recognized as matching one of host-based IDS detection templates, host-based IDS's can detect the intrusion.

A set of data gathering components which use kernel audit data 70 and system log data 72 provides a way of observing what activity is occurring on the systems and networks. This is accomplished through a set of data gathering modules that gather and format information from data sources at various points within the system.

A correlation engine 78. This processes the data from the data sources described below and determines whether an intrusion has occurred.

A secure communications link 78. The host-based IDS needs a means of stopping an attacker from observing the traffic between its components and possibly sending false data to disrupt its operations. An encrypted link can prevent this from happening.

A brief overview of FIG. 1 operation is now provided. The host-based IDS 50 examines information about system activity from a variety of data sources. These include kernel audit data 70 and system log files 72.

The host-based IDS 50 analyzes this information against stored configured attack scenarios. The host-based IDS 50 then identifies possible intrusions and misuse immediately following any suspected activity and simultaneously communicate an alert and detailed information on the potential attack to the host-based IDS GUI.

The host-based IDS 50 includes a set of pre-configured "patterns" or detection templates 65. These patterns are the building blocks used to identify the basic types of unauthorized system activity or security attacks frequently found on enterprise networks. Within the host-based IDS 50, these patterns 65 are referred to as detection templates. As a result of the inclusion of these detection templates 65, the user will be able to start detecting potential intrusions right away, rather than having to first create and/or configure a set of detection templates.

The user can construct different combinations of detection templates into what are referred to as surveillance groups. A surveillance group often includes related detection templates, such as, for example, those related to file system intrusions or web server attacks. Each surveillance group provides protection against one or more particular kinds of intrusion.

Using host-based IDS, a surveillance group is then scheduled to be run regularly on one or more of the host systems it is protecting, on one or more chosen days of the week, and at one or more chosen times. This process of configuring surveillance groups to protect hosts on the basis of a regular weekly schedule is referred to as creating a surveillance schedule. A single surveillance schedule can be deployed on one or more host systems; the user has the option of creating different surveillance schedules for use on one or more of the different systems within the network.

As mentioned above, the host-based IDS 50 provides intrusion detection by monitoring the following two data sources:

Kernel audit data. This includes kernel audit logs which are generated by a trusted component of the operating system. The kernel audit logs generally include all the information about every system call executed on the host, including parameters and outcomes, and are the lowest level of data utilized by the host-based IDS system 50. (System calls are services requested to the underlying operating system by an application or user level program.) This data may also include information about starting and stopping sessions for users.

System log files. System log files include data on system activity at the user level recorded via the syslog facility. This includes successful logins and logouts, reports from network service daemons, and httpd. Such data provide a high level view of the status and health of the various services in the system.

Within the host-based IDS system 50, there must be secure messaging and protocols for all communications between its components. Host-based IDS's secure communication is built upon the Secure Socket Layer (SSL) protocol for client/server interaction.

Secure Sockets Layer (SSL) is a widely used standard for securing communications over untrusted networks. SSL prevents unauthorized modification or deletion of data as it flows across the network. In addition, it can detect when an interloper sends messages which purport to be from another machine. It is a general communications protocol and can use a variety of encryption techniques.

IDS uses SSL to encrypt all traffic between the management station (i.e., the host running the GUI) and the agent systems (systems performing intrusion detection).

Figure 2:
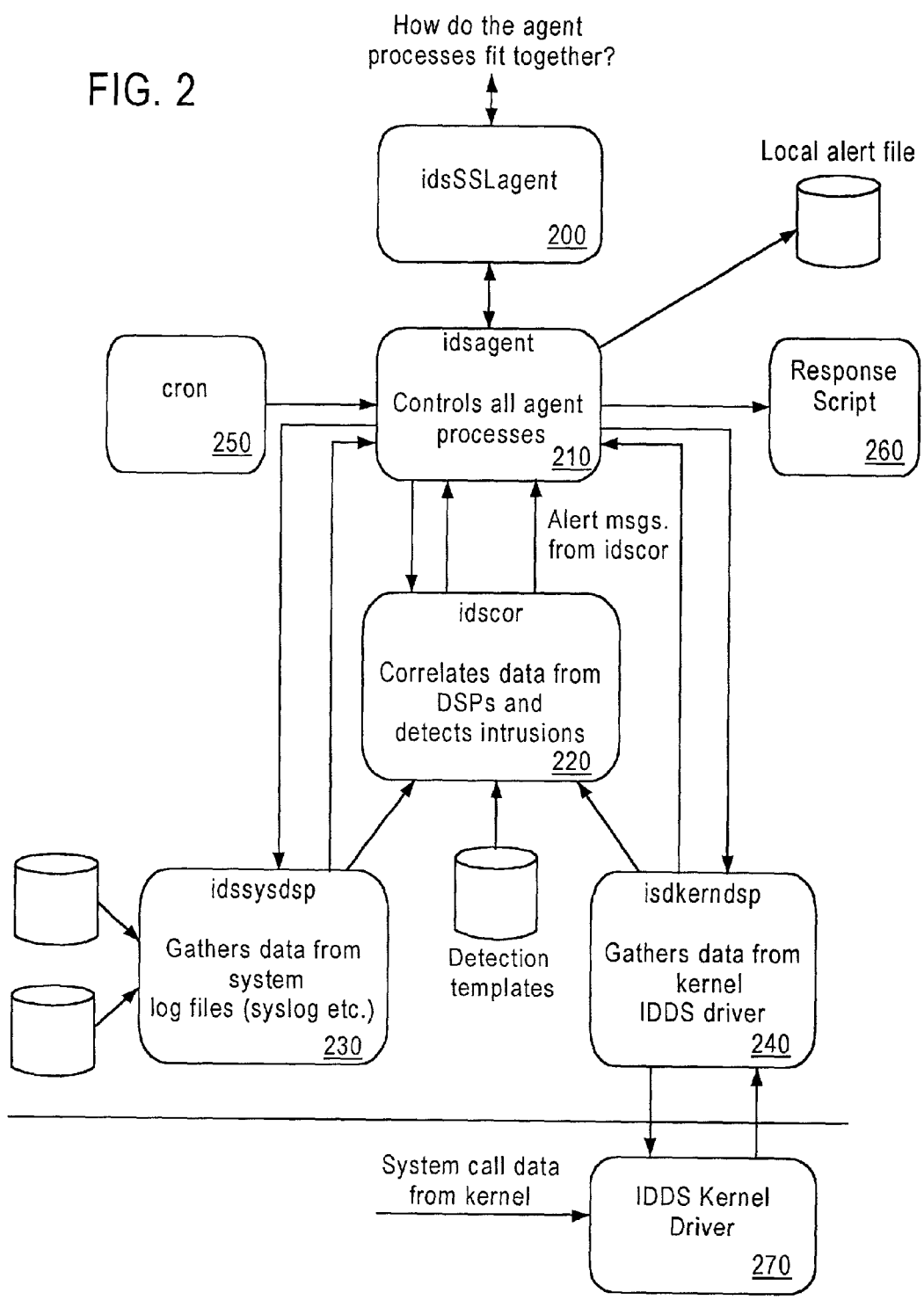
FIG. 2 is a more detailed illustration of the logical architecture according to the present invention.

FIG. 2 is a diagram illustrating logical architecture of an intrusion detection system according to the principles of the present invention. FIG. 2 provides greater detail than FIG. 1 regarding agent 60.

Data input: a data input channel.

Data output: the channel that the process sends its output on.

Command input: command from the idsagent are sent to each process on this channel.

Status output: status data is provided by the process on this channel in response to a status command on the command channel.

The IDS agent 210 provides an interface between the IDS system 50 and the network. The IDS agent 210 encrypts all traffic to a GUI and decrypts traffic from an idsSSLadmin process which runs on the computer which runs the GUI.

idsagent 210

An idsagent 210 is the main control process of the intrusion detection system. The idsagent 210 is responsible for starting and stopping all other processes. When started, it will fork off a copy of the idsSSLagent 200 to communicate with the GUI.

The idsagent 210 will perform initialization steps and then await commands from the GUI. If a schedule is downloaded and started, the idsagent 210 will start an idscor process 220, and whichever of the idssysdsp 230 and idskerndsp 240 processes are required.

The idsagent 210 creates the low and high bandwidth connections between itself and the agent processes. The low bandwidth connections are built using POSIX message queues. The high bandwidth connection is built using a memory-mapped file. The advantage of the memory mapped file is that it does not require a system call to read or write data from/to it. Processes access the map file via a pointer in their address region.

The idsagent 210 will monitor each of the agent processes. If a process dies unexpectedly it will reap the return value. In addition, it will attempt to handle failures gracefully either by restarting the failed process or by shutting down and sending an error message to the administrative GUI. If this occurs the administrator can examine the error and attempt to restart. The restart process will be attempted a fixed number of times, as defined in a header file. If after the maximum number of restart attempts the idsSSLagent 200 cannot be started, the idsagent 210, and all other processes, continue to run as usual. However, no alerts can be sent to the GUI and no commands can be received.

If one of the agent processes dies (idscor 220, idssysdsp 230 or idskerndsp 240) then the idsagent 210 will halt the currently executing schedule and send an error message to the GUI.

If the idscor 220 process reports an intrusion then the idsagent 210 will perform three steps:

1. It will log the intrusion alert record to the local alert log file.

2. It will execute the alert response scripts and pass then the alert details as command line arguments. The alert response script are located in /opt/ids/lbin/ids_alertResponse 3. It will package the alert text encrypt it and write it to the GUI for display.

When a schedule is downloaded to the idsagent 210, it will first consult its configuration file to verify that the detection templates specified in the schedule are installed on this agent system. This step merely verifies that the templates in the schedule are supported by the idsagent 210, it does not perform any checking on the parameters specified for each template. If a template is found in the schedule which does not exist in the configuration file, an error message is sent to the GUI. If all templates are supported, the idsagent 210 will parse the groups in the schedule and determine which groups are scheduled at which time. It will then write a crontab file for the "IDS"user. This crontab file will be used at a later point to execute a program that instructs the idsagent 210 to start a particular group.

The role of the correlator 220 is to determine if an intrusion has occurred. All the other processes in the IDS architecture support the correlator 220 in this role—the data source processes provide it with raw data, and the idsagent 210 waits for output from the correlator 220.

Event Correlation Services (ECS) allows for the correlation of discrete events over time. It operates similarly to a virtual machine into which bytecode is loaded. The bytecode corresponds to correlation "circuits". Each circuit is written by a user to analyze the flow of events through the ECS engine in real-time.

The ECS engine in the ids is embedded within the IDS correlator process 230 to improve performance. The rate of data generated from the kernel is very high; the path from the kernel to the correlator must be as short as possible. The ECS engine in host-based IDS 50 has been built to parse and understand kernel audit records, system log files and other data sources. It uses a meta-description language (MDL) to define what a record in a data stream looks like. The MDL specifications allow for fast parsing of the event streams.

The idscor process 220 is a virtual machine which interprets the bytecodes stored in the detection templates. The templates (alternatively described as circuits) encode the logic required to determine if an intrusive activity is present in the input data stream.

The correlator 220 is said to be event driven: as each event arrives it is sent to the templates. Templates may be configured to receive events of specific types, so a template which processes kernel audit data will not receive system log data, for example. Because the correlator 220 is event driven, it will not poll the system for data: if no data is arriving then the correlator process 220 is idle.

The correlator runs as the idscor process 220 in the host-based IDS architecture. At its heart lies a technology developed by HP named ECS: Event Correlation Services. ECS was originally developed in the telecommunications division to monitor SNMP and CMIP traps from network elements. It was used by a network administrator to suppress alarm storms and perform root-cause analysis on network failures. We have adapted its core event-flow functionality for use in intrusion detection, and layered our code around the core ECS library.

ECS Terminology

ECS: Event Correlation Services—an event driven correlation product from HP.

circuit or template: A bytecode specification for correlation, created by the ECS Designer GUI. The bytecode is loaded by the engine core and executed as events are received by the engine.

engine core or core library or ECS library: The core correlation executes the circuit bytecode.

Designer GUI: A graphical component used to build circuits for ECS.

idscor: The correlation process that is executed as part of the host-based IDS infrastructure. It encapsulates the ECS engine core with functionality that interfaces with the other host-based IDS processes.

MDL: Meta-Data Language is a specification of the layout of events as an ECS circuit will view them. For example, the MDL file for kernel audit will specify how the fields are laid out in the audit records.

endecoder: A translator module that interprets an MDL specification and converts audit records and other events into internal ECS event format structures.

template group: The GUI groups templates together into template groups which are scheduled to execute at certain times of the week. These template groups are literally a list of circuit names to load.

data store: Circuits are fixed bytecode streams, but the circuits need information about the outside world passed to them. A data store parameterizes a circuit and allows passing of external values that can be queried by the circuit at run time. Values are encoded as (name, value) pairs; the circuit performs a lookup based on the name part, and receives a value back.

fact store: Almost the same as a data store, except that the values stored in a fact store are encoded as (leftval, relation, rightval) and queries can be performed on both leftval and rightval.

enable/disable of circuits: After being loaded a circuit is in an idle state and will not receive events from the engine until it has been enabled. Once enabled it will process events and carry out any internal functions until it is later disabled.

event flow or event driven: Programs are usually thought of as being driven by a flow of control: if the code requires data it will obtain it. However, the ECS engine core operates using an event driven model: events arriving at the engine core trigger processing.

event or message: Any piece of information which is being correlated by the circuits in the engine. For example, kernel audit data, syslog records or login records are all delivered to the engine as events.

cron 250

The cron daemon 250 reads the crontabl for user "ids" and executes the idssc program at the specified intervals. This is used to start and stop surveillance groups.

Once an intrusion is detected, the idsagent 200 will execute the binary located at the path/opt/ids/Response. Each command line argument to this binary will be a field of the alert.

The order of the arguments passed are:

| Argument | Type | Description |
| --- | --- | --- |
| argv[0] | string | Name of the executable |
| argv[1] | integer | Unique code for alert message |

-continued

| Argument | Type | Description |
| --- | --- | --- |
| argv[2] | integer | Version number on alert (identifies product version) |
| argv[3] | integer | Severity level of alert (1 is most severe) |
| argv[4] | string | Timestamp on alert YYYYMMDDHHMMSS |
| argv[5] | string | Source of attack if known |
| argv[6] | string | Target of attack if known |
| argv[7] | string | Alert description |
| argv[8] | string | Full alert text | idscor 220

The idscor 220 process contains the correlator which processes the raw events and determines if an intrusion has occurred. It obtains the data from the memory mapped file created by the idsagent 200. The idscor 220 is linked via this mmap file to the idssysdsp 230 and the idskerndsp 240. The idscor 220 will poll each file in turn looking for data.

The idscor 220 is essentially a virtual machine which runs the bytecode defined for each detection template. Each template contains code that will determine if a particular type of intrusion has occurred. The idscor 220 can run many templates simultaneously.

The idscor 220 is forked by the idsagent 200 when a surveillance group is being started. It is passed on the command line the id's of the low-bandwidth status and command channels, and the high-bandwidth memory-mapped file channel. The idscor 220 then receives commands over the command channel from the idsagent 200.

idssysdsp 230

The idssysdsp 230, also termed the Syslog DSP, is responsible for gathering data from ASCII line oriented files. It can also read from btmp/wtmp/utmp formatted files. The acronym DSP stands for Data Source Process.

The idssysdsp 230 will read data from a file and then forward it to the idscor 220 for processing. The idssysdsp process 230 does no processing on the data read, other than to format it as ASCII. Thus, any binary data read from btmp/utmp/wtmp is printed as ASCII and sent to the correlator idscor 220.

The idssysdsp 230 is started by the idsagent 200 when a surveillance group is started. It is passed on the command line the name of the memory-mapped file to communicate with the idscor 220.

idskerndsp 240

The idskerndsp 240, also termed the kernel DSP, is responsible for opening and reading data from the kernel audit device driver, /dev/idds. The idskerndsp 240 will read blocks of audit records from the driver and reformat them as ASCII data to send to the correlator idscor 220.

The idskerndsp 240 is started by the idsagent 200 when a surveillance group is started. The idskerndsp 240 is passed on the command line the name of the memory-mapped file to communicate with the idscor 220.

The idskerndsp 240 is also responsible for enabling audit of selected audit records according to which templates are being used as described in greater detail below. When the idsagent 200 is starting the surveillance group, it will send data to the idskerndsp 240 indicating which audit records the detection templates require. The idskerndsp 240 will then do a ioctl call to the idds driver to enable those system calls for audit.

IDDS Kernel Driver 270

The IDDS (Intrusion Detection Data Source) driver 270 is a kernel pseudo-driver which provides an interface to the new kernel audit system. The audit system was designed to specifically support the intrusion detection system 50.

The idskerndsp 240 will open the driver device and send configuration data to the kernel. The idskerndsp 240 will read audit records in blocks from this device.

The IDDS kernel 270 component has a fixed size buffer in which to store audit information before it is passed to a user space application. If that storage buffer becomes too full, the IDDS system has two choices on how to handle a new audit record: discard it, or wait until space is available for it in the kernel buffer.

In blocking mode the IDDS subsystem 270 will wait until there is space in the buffer for the new audit record. The calling process is blocked until space becomes available for the audit record. Once space is made available the audit record is stored in the buffer and the process continues. Blocking mode sacrifices some system performance for security.

Reading from the audit buffer is done on a separate context from writing to the buffer, so there is no danger of the system deadlocking.

In non-blocking mode the host-based IDS will discard the audit record information if no space is available in the buffer. Non-blocking mode sacrifices security for system performance.

The IDDS provides the IDS agents with a system call level trace of activity on a system.

The developers of the host-based IDS have identified a subset of system calls on HP-UX which have security relevance, and occur frequency in exploits. The IDDS subsystem 270 in the kernel will record these system calls as they occur. The system call trace is made available to the host-based IDS agents via a device driver in the kernel: /dev/idds. The host-based IDS agent opens this device and reads system call information as it occurs.

Some key features:

Designed for minimal overhead impact on the system

Gathers path and file data

The data is designed to support intrusion detection and not to be logged and forgotten about.

Allows per-user and per-system call filtering of events

Can operating in "blocking" mode: system calls are halted until the host-based IDS agent can catch up reading the data stream.

Can also operate in "non-blocking" mode: if system calls occur faster than the host-based IDS agent can read them, the audit record is discarded.

In order to obtain the best possible degree of host-based activity monitoring (and to protect against viruses and the attacks described above) the IDS must have secure access to a robust, low-level system audit stream. Some effective host-based intrusion detection can be achieved by monitoring the syslog file and other various log files. These logs provide valuable information about system activity that can be used to detect a wide range of attacks, but because the log-files only contain high-level information the attacks described earlier could not be detected using only log-file data. Furthermore, log-files themselves are subject to attack and could be altered to either confuse, over-activate, or bypass the intrusion detection system. Nevertheless, some common attacks that can be detected using log-file data include: SATAN scans, NIS spoofing, attempts to discover passwords, failed accesses, etc.

The host-based IDS 50 may accept data streams from a number of log files, from the network, from ServiceGuard™ "monitors", and/or from special versions of the HP-UX audit system. This special audit system called "IDDS" is developed for the host-based IDS and may:

a) Operate in both standard mode and trusted mode (vs. trusted mode only)

b) Provide enhanced audit content to maximize misuse detection capability.

c) Feed the audit stream directly to the host-based IDS 50 for maximum security—there may be no intervening audit file subject to attack and modification—and minimum response time.

d) Enable selective audit and filtering to reduce the amount of data that must be processed by the host-based IDS 50 thereby reducing system overhead and improving overall IDS performance.

Detection Templates

A detection template is a representation of an algorithm to detect a vulnerability exploitation. For example, a detection template may be written to generate an alert when the setuid bit is enabled on root owned executables. The template contains logic which will process the kernel event stream and determine if a file has had the setuid bit enabled. A detection template contains filtering code to discard events not relevant to the activity it is looking for. It also contains state nodes to record previous event activity for comparison with future activity.

The host-based IDS provides a hierarchy of groupings to simplify configuration of an agent system:

Surveillance Schedule: A grouping of surveillance groups set to execute at particular times of the week.

Surveillance Group: A grouping of detection templates to be used in building a surveillance schedule.

Detection Template: The lowest level of the hierarchy: a bytecode representation of an algorithm to detect intrusions.

Detection Templates are grouped into Surveillance Groups which are in turn scheduled to execute in a Surveillance Schedule. The Surveillance Schedule is the item downloaded to a host-based IDS agent system.

The following processes are present on a host-based IDS system: these two processes are always running on an agent idsagent master control process 210 for the IDS agent; idsagent 210 provides SSL connection to GUI.

These processes may be running if a Surveillance Schedule is active on the agent system: idscor 220 which is the correlator process which analyzes events; idskerndsp 240 which gathers the kernel audit records for idscor 220; and idssysdsp 230 which gathers system log data for idscor 220.

A host-based IDS management station which is running the GUI will have the following processes: idsgui The GUI process, running under a Java VM; the IDS GUI provides SSL connections to all the agents.

The host-based IDS does not provide an alert that exploit XYZ has been launched against the host. Rather the host-based IDS lets the user know of suspicious activity on the system that is taking place. The user will need to customize the detection templates to meet the needs of the environment. If the user has a particular application that generates a heavy volume of alerts due to its normal mode of operation, the user can enter additional filtering into the necessary detection templates to reduce the number of alerts generated by this application. Most notably is the creation of world writable files and modifying non-owned files. Most templates offer mechanisms by which these spurious alerts can be suppressed. This type of filtering should be part of the product configuration so that the user does not get overwhelmed with unnecessary alert generation.

Figure 3:
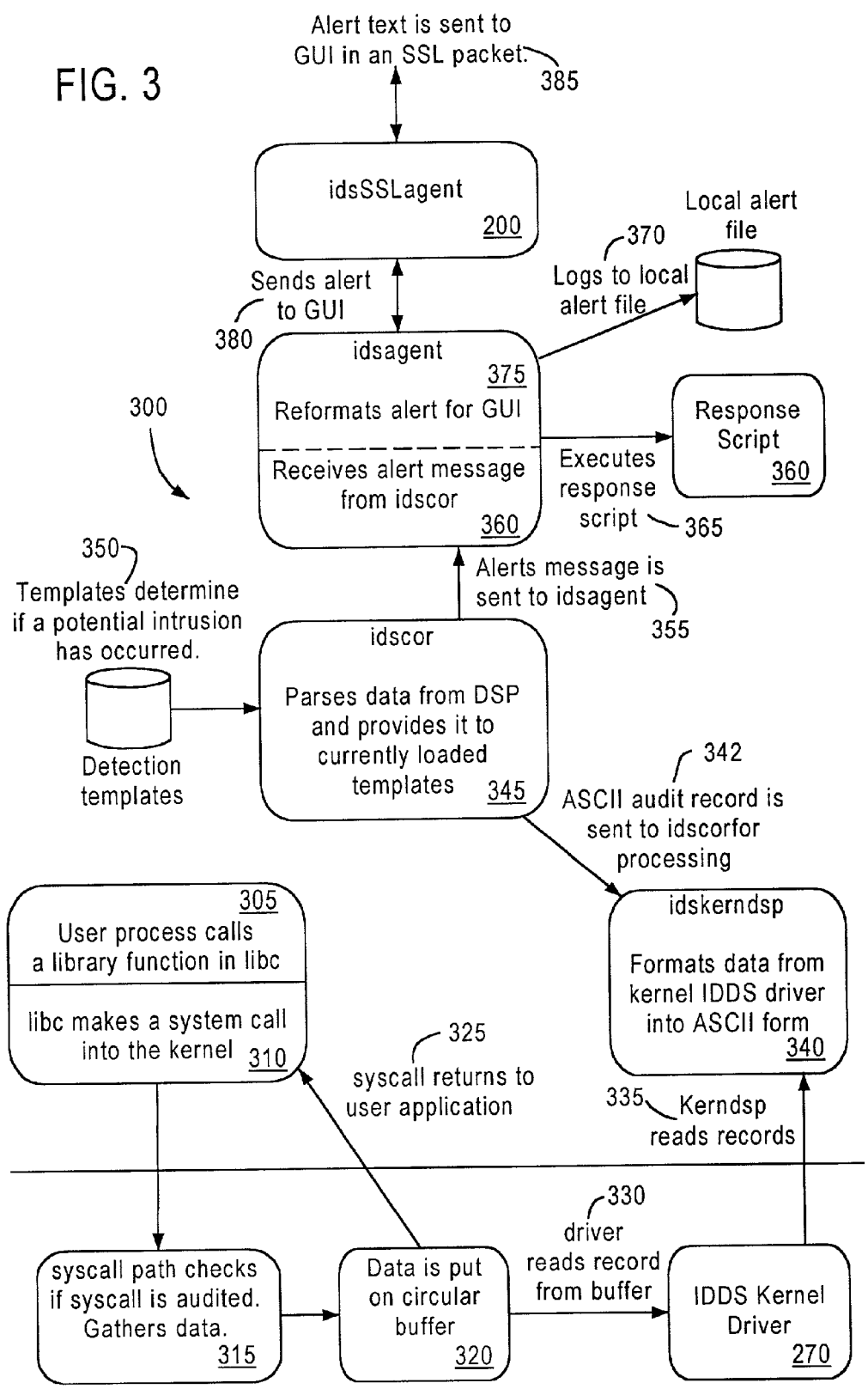
FIG. 3 is a flow diagram according to the present invention.

Refer now to FIG. 3, where a flow diagram illustrating an example of how intrusions are detected. At step 305, a user process makes a libc library call: the open( ) or unlink( ) calls for example. At step 310, the libc library translates the call into a system call and calls the system call dispatch entry point. At step 315, the initial component of the syscall handler checks to see if this system call is being audited by the host-based IDS. If the system call is being audited, the initial component of the syscall handler gathers some header related information: user id, group id, timestamps, process id, etc. At step 315 as the system call is processed, information is stored in temporary buffers. This information corresponds to the arguments of the system call and any further data that is reported. Once the system call completes, the return value and errno value are recorded. At that point the entire record is placed in a circular buffer in the kernel audit driver. At step 325, the system call returns to the user process context. At step 330, a read( ) of /dev/idds has forced the IDDS kernel driver 370 to read the next audit record block from the circular buffer. At step 335, the system call block is passed up to the user context of the idskerndsp 240 in response to the read ( ) call. At step 340, the idskerndsp 240 reformats the raw binary audit record as ASCII data in a format that the correlator idscor 220 will understand. At step 345, the correlator idscor receives the data and parses it using MDL into an internal vent format. At step 350, the detection templates take this internal event format and process it. The ECS using a detection template may decide that an intrusion has occurred. At step 355, the detection template generates an alert message in the internal event format. The idscor 220 takes this alert message and reformats it as an ASCII message. This message text is sent on the status output channel to the idsagent 210. At step 360, the idsagent 210 is polling the status connection from the idscor 220 periodically. The IDS agent 200 receives the alert message and reads it from the status connection. At step 365, idsagent 210 then executes any local alert response script and passes them the alert details. At step 370, the alert is logged to the local alert log file. At step 375, the idsagent 210 reformats the alert for the GUI. At step 380, the alert message is sent to the idsSSLagent 200.

Figure 4:
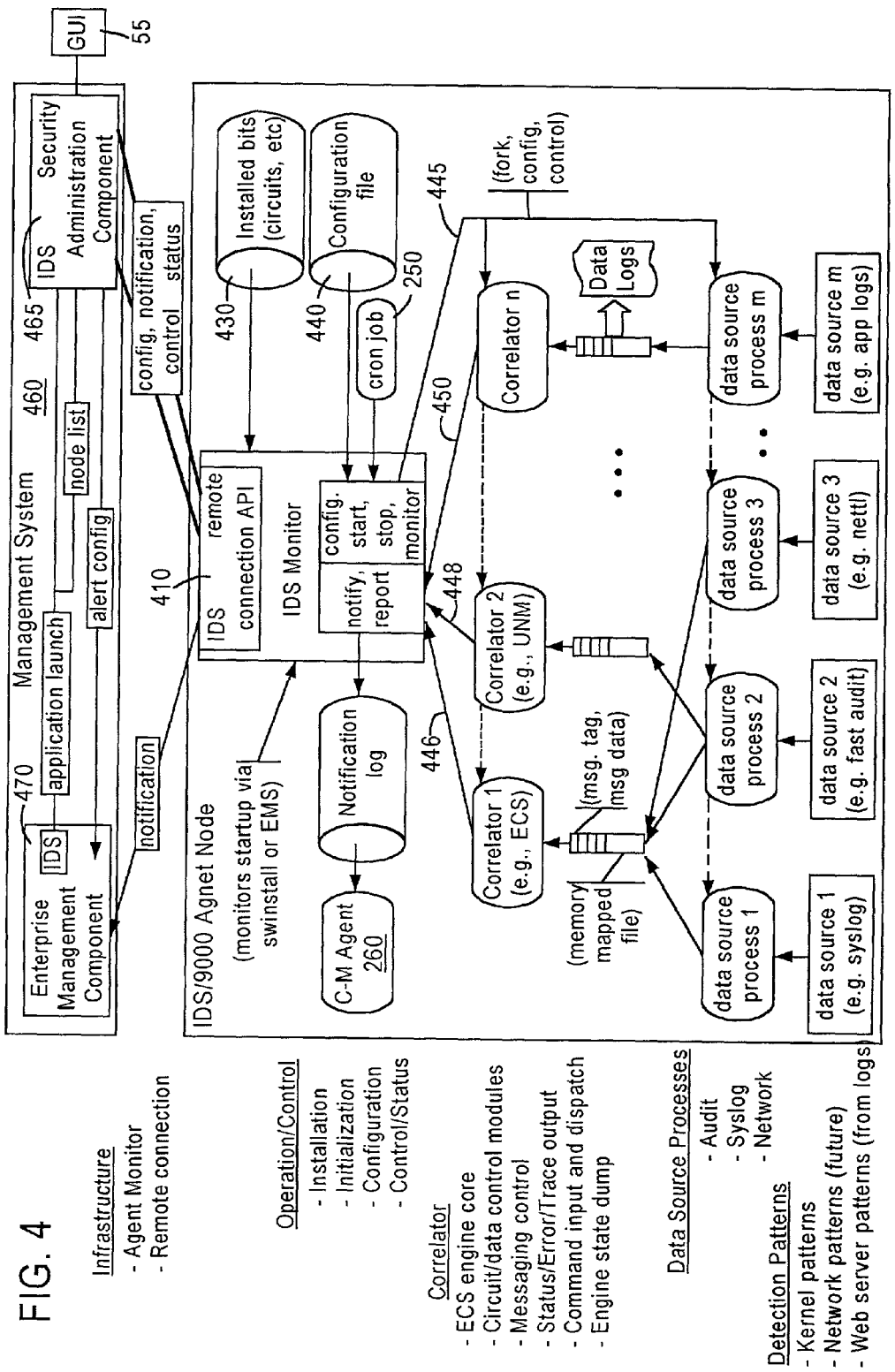
FIG. 4 is a logical architecture illustrating in greater detail the different correlators usable in the present invention.

FIG. 4 is an illustration of a logical architecture, similar to FIG. 2, but showing in greater detail the idscor 220 which is shown in FIG. 4 as corrrelator 1, correlator 2 . . . correlator n. Information flows upward from data source process 1, data source process 2, data source process 3 . . . data source process n to any or all of the correlators 1-n. It should be noted that data process source 1 corresponds to idssysdsp 230 in FIG. 2 and data source process 2 corresponds to the idskerndsp 240. Further it should be appreciated that the host-based IDS 50 may not necessarily have all these processes that the overall architecture of the host-based IDS 50 supports. In fact, the host-based IDS 50 can support multiple correlators and multiple data sources. However, there does not need to be a corresponding number of data source processes and correlators. In other words, there can be one or more correlators with many data source process or one or more data source processes with only a single correlator. Each data source process and correlator should add some measure of intrusion detection capability or the expense of processing speed and additional processing resources required. The IDS monitor process 410 is the main control process and corresponds to a combination of the functionality of the idSSLAgent 200 and the idsagent 210 described with respect to FIG. 2. The IDS monitor 410 is responsible for connecting with all the functional components depicted in FIG. 4 and it is responsible for taking commands issued by the user and translating them into commands to send on to the processes that are running below it. In addition, the IDS monitor 410 is responsible for monitoring the status of the processes running on the system and it is responsible for gathering alert information generated by the correlators 1-n and forwarding that to the GUI 55. The other task the IDS monitor process 410 must perform is if the user has scheduled to run surveillance schedules at a future time, the IDS monitor 410 is responsible for initiating the processing. The IDS monitor 410 is responsible for executing with the response scripts 260 (shown in FIG. 4 as C-Magent 260). When an alert is detected, the alert will be written in a notification log (shown as local alert file in FIG. 2). A configuration file 440 details how the host-based IDS 50 is put together, what circuits are installed, etc. The IDS monitor 410 interacts with cron job 250 as described with respect to FIG. 2 to launch surveillance schedules at a specific time.

The correlator 1, correlator 2, . . . correlator is a layer which processes the data coming off the system in conjunction with the templates to determine if there has been an intrusion. As depicted in FIGS. 1 and 2 there is only one correlator present, but the architecture supports multiple correlators.

Correlator 1 uses the previously described ECS technology. Correlator 2-n can use other correlation technologies. Communication occurs between the correlators 1-n and data source using memory mapped files 1-n and processes 1-n. The memory mapped files are low overhead, high bandwidth connection between processes running on a system. Specifically by generating data and pulling data into a memory mapped file by reading the data, the host-based IDS 50 does not generate system calls. These memory mapped files 1-n are created by the IDS monitor 50 when the correlators 1-n are being started. When the IDS monitor 50 starts the correlator it also creates a connection to send commands from the IDS monitor 410 to the correlators (see arrows 445) and creates other connections (446, 448, 450) from the correlators to the IDS monitor 410.

The IDS monitor 410 also interacts with a management system 460. The management system 460 includes an IDS security administration component 465 and an enterprise management component 470. The IDS monitor 410 sends notifications to the enterprise management component 470. The IDS monitor 410 interacts bi-directionally with the IDS security administration component 465 including configuration, notification, control and status. The IDS security administration component 465 has a GUI 455 for displaying alert notifications. The enterprise management component 470 provides the application launch and node list to the IDS security administration component 465. The IDS security administration component 465 also sends an alert configuration to the enterprise management component 470.

Figure 5:
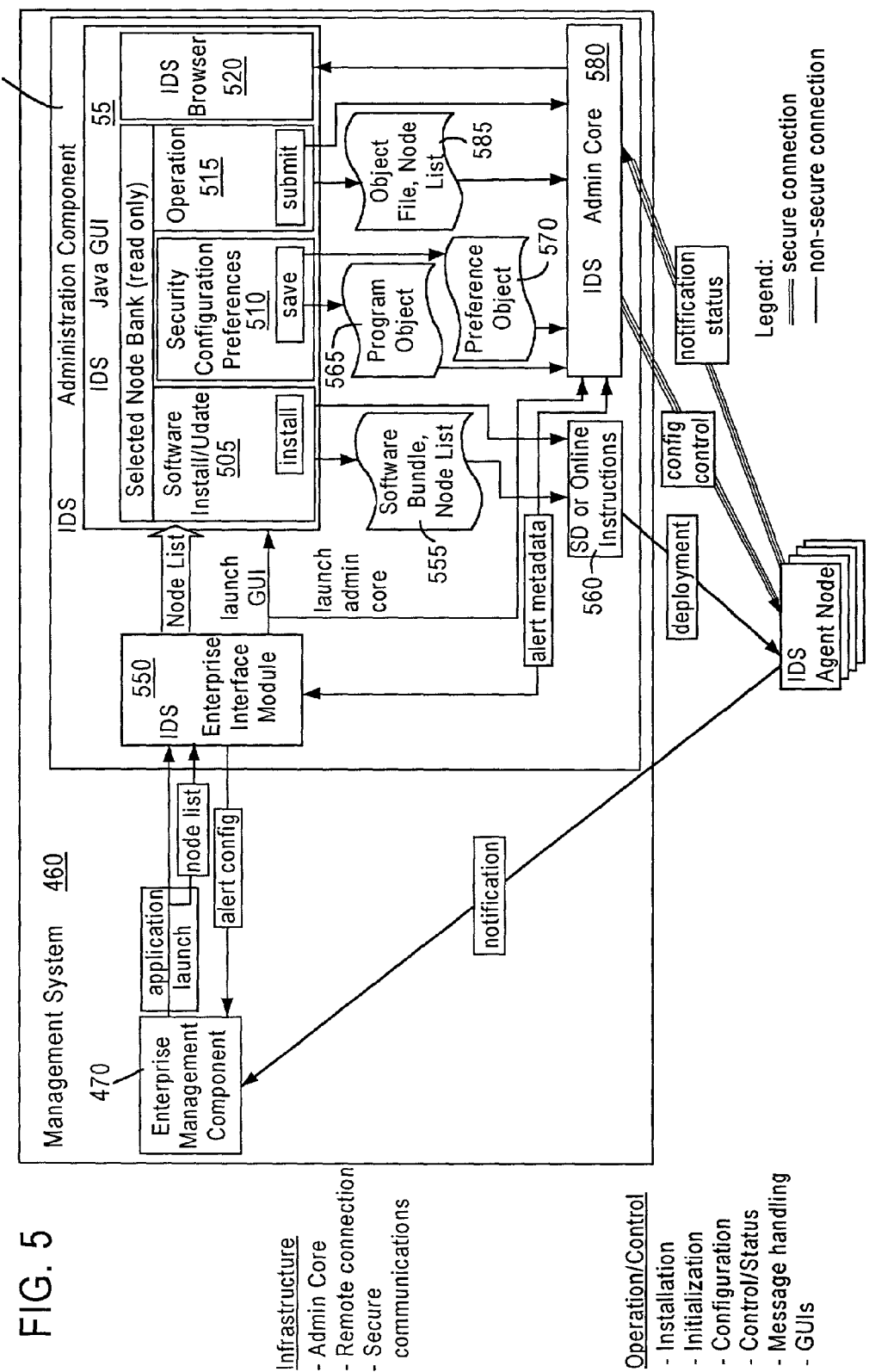
FIG. 5 is a logical architecture illustrating in greater detail the administrative component used to administrate one or more agent nodes according to the present invention.

Referring now to FIG. 5, FIG. 5 illustrates a more detailed view of the IDS security administration component 465. It should be noted that one administration component 465 can control many IDS agent nodes.

The IDS security administration component 465 is responsible for creating surveillance schedules and groups and communicating these with the respective IDS host-based agent nodes. A software install/update module 505 which is located in the IDS GUI 55 can be used to install or update software on IDS agent nodes as updates become available. A security configuration preferences module 510 allows the administrator to save various security configuration preferences for the particular GUI. Also the security schedule groups and configurations can be saved using module 510. Operation module 515 is used for query, shutdowns and various other operations of the GUI and IDS agent nodes. The IDS browser 520 is used to sort, query and search alerts. An IDS enterprise interface module 550 allows the IDS GUI 55 to be plugged into various other enterprise architectures such as HP OpenView VP/0 architecture. Thus, the IDS GUI 55 can be managed from HP OpenView VP/0 management software. When a surveillance schedule is generated the program object 565 is generated. When the preferences are saved, then the preference object 570 is generated. The program object and preference object send information to the IDS administrative core which in turn communicates control configuration and notification status along secure connections to the respective IDS agent nodes. A node list is generated by the operation module 515. The object node list is generated when the processes are stopped, started and queried the status of the agent nodes which in turn is packaged as an object file and sent to the IDS administrative core 580 and then is forwarded on to the respective IDS agent node. The IDS administrative core 580 is responsible for secure communications with the multiple IDS agent nodes.

The Surveillance Group and Surveillance Schedule Screens

Configuration Screens enable the user to create and configure host-based IDS detection templates, surveillance groups, and surveillance schedules. These Screens are accessed from the System Management or Host Management Screens by selecting either Surveillance Group or Surveillance Schedule from the Edit pull-down menu.

The host-based IDS product includes a number of detection templates which have been created and pre-configured. When the user initially select the Surveillance Group menu item, the Select a Surveillance Group box will open. The predefined detection templates will become visible when the user either presses the Edit button in this box to modify an existing surveillance group or the New button to create a new surveillance group.

The host-based IDS does not come with any pre-existing surveillance schedules. The user can create and subsequently view the host-based IDS surveillance schedules when you select the Edit—>Surveillance Schedule menu item. This will open the Select a Surveillance Schedule box. Which surveillance groups have been combined into a given surveillance schedule can be viewed by pressing the Edit button in this box.

Changing the Pre-Configured Detection Templates

Each detection template is designed to identify a specific type of unauthorized system activity and may have configurable parameters. The detection template directs the agent to monitor a security related activity on a host system.

For example, a Failed Login detection template checks the number of failed logins within a given time interval on a host system. Both the number of failed attempts and the time interval are configurable. If a user fails to correctly login and meets the triggering criteria, an alert is issued.

If a detection template has configurable parameters, the parameters may be configured once the detection template has been incorporated into a surveillance group.

One or more detection templates can be configured into a surveillance group. After a surveillance group has been created, it can later be modified or deleted.

The Modification of Files/Directories Template

The template:

Monitors a user specified set of files for successful change attempts.

Monitors user specified directories (with exclusion rules) for successful attempts to change the content or the addition/deletion of files in the directory and all subdirectories below it.

Monitors for changes of owners or file permissions of the specified files, and logs an alert only if an actual change to the permissions/owner occurs.

This template does not determine that a file's contents were changed—only that a change might have been made (i.e. it does not watch the content of the files).

The modification of files/directory template uses kernel audit data generated by the IDS set of kernel patches.

The modification of files/directory template is useful because many of the files on a HP-UX system should not be modified during normal operation. This includes the various configuration options, system supplied binaries and libraries, and the kernel. Additionally, software packages are generally not installed or modified during a system run. However, when an attacker breaks into a system, the attacker frequently will create backdoors to let themselves in later. Also, the attacker might use a "rootkit" to modify the system binaries such that they do not report the changes that were made.

There are four configurable properties that are used in the filtering system:

Watch these files for modification/creation

Ignore these files

Watch these directories for modification

Ignore these directories

If a file is explicitly included, then any change will be logged. This template ignores the exclusion clauses for explicit listings of files only.

If a file is not explicitly included, but its directory is, then any change will be logged only if 1) The directory is not explicitly excluded, and 2) The file is not explicitly excluded by name.

For example, if the following values are set

Watch these files for modification/creation=[/etc/passwd, /etc/foo/conf/nochange]

Ignore these files=[/etc/ptmp]

Watch these directories for modification=[/etc, /bin]

Ignore these directories=[/etc/foo/conf]

then if a change was made to /etc/foo/conf/changeable, no alert would be generated because the directory /etc/foo/conf is explicitly excluded.

If /etc/foo/conf/nochange was modified, an alert would be generated because that file is explicitly listed, even though the directory is excluded.

If /etc/ptmp is modified, no alert is generated because it is specifically excluded.

If /etc/rc.config.d/lp is modified an alert is generated.

The default files for modification/creation include

/stand/vmunix

/stand/kernrel

/stand/bootconf

These are the system kernel and its configuration files. Changes made to these files will affect the system at the next kernel configuration or system reboot.

/etc/passwd

/etc/group

These files define the users on a system. Changes to /etc/passwd can create accounts, including accounts with superuser access.

/etc/inetd.conf

This file controls what network services are running, and what programs are used to fulfill the service requests. An attacker might change this file to open up a backdoor that they can access over the network.

/.rhosts
/.shosts

These files are used to control the remote access of the user 'root' without requiring a password. One technique used to create a backdoor is to modify these files to permit root access without a password from anywhere.

Ignore these files

/etc/ptmp
/etc/.pwd.lock

These are temporary files created by the program vipw and are not used for any system configuration.

Watch these directories for modification

/bin
/sbin
/usr/bin

These directories hold the system supplied binaries.

/lib

These are the system libraries that control the way that most user and system programs behave.

/opt

This is where software packages are installed.

/etc

This is where most of the system configuration files are stored.

/stand

This is where most of the kernel configuration data is stored.

Ignore these directories
There are none set by default.

Changes to Log Files Template

The changes to log files template monitors a user defined list of files for attempts to modify them in any way other than appending.

The log files template does not:

It does not examine the actual disk I/O that takes place. It will generate alerts if someone is capable of modifying the data.

It does not monitor the owners or permissions of files. This template will not detect if they are changed.

This template uses kernel audit data generated by the IDS set of kernel patches.

The changes to log files template is useful because there are certain files that are used to store logs of system activities. This includes login attempts, commands executed, and miscellaneous system log messages.

The files that store this information should only be appended to, not overwritten. An attacker will often either modify or delete these files to remove information about their intrusion.

The default file list includes:

/var/adm/utmp
/var/adm/btmp
/var/adm/wtmp
/etc/utmp
/etc/btmp
/etc/wtmp

These are the log files that store information on logins and login attempts.

/var/adm/messages
/var/adm/syslog/mail.log
/var/adm/syslog/syslog.log

These are frequently used to store syslog messages (messages generated by various programs).

/var/adm/pacct

This file keeps a log of what user executed what command and a timestamp of the occurrence.

Creation of SetUID Files Template

The creation SetUID files template looks for the creation of a SetUID file by users from a list of UIDs. A SetUID file is one that will run with the access level of the owner instead of the access level of the user executing it.

The SetUID template monitors for the following actions:

Modification of the permissions on a file to enable the SUID bit.

Changing the owner of an SUID file to one of the UIDs on the user specified list.

Creation of a file that has the SUID bit set.

The SETUID template uses kernel audit data generated by the IDS set of kernel patches.

The SETUID template is useful because a SUID file is one that, if executed, will operate with the permissions of the owner of the file, not of the person executing the file. One of the frequent backdoors that a intruder will install on a system is the creation of a copy of the /bin/sh program that is the setuid root. Such a file allows any command to be executed as the superuser.

The default list of users being monitored is:

0—root
1—daemon
2—bin
3—sys
4—adm
5—uucp
9—lp
11—nuucp

Creation of World-Writable Files Template

The creation of world-writable files template looks for the creation of world-writable files owned by users from a list UIDs. A world-writable file allows any user to modify the contents of the file.

This template monitors for the following actions:

Modification of the permissions on a file to enable the world-writable bit.

Changing the owner of a world-writable file to one of the UIDs on the user specified list.

Creation of a file that has the world-writable bit set, owned by one of the listed UIDs.

This template uses kernel audit data generated by the IDS set of kernel patches.

The creation of world-writable files template is useful because a world writable file is one that any user of the system can modify. In many cases, the files owned by the system users (see the default list) are used to control the configuration and operation of the system. Allowing regular users to modify these files exposes the system to attacks by regular users.

The default list of users being monitored are:

0—root
1—daemon
2—bin
3—sys
4—adm

5—uucp
9—lp
11—nuucp

Repeated Failed Logins Template

The repeated failed logins template monitors the records of failed attempts to login to the system, and generates an alert if a user defined threshold is exceeded.

This template collects information from /var/adm/btmp. This log is used to detect failed login attempts.

The repeated failed logins template is useful because any way an attacker might gain access to a system is by repeatedly attempting to guess the password for an account. Most standard login programs are able to record these failures, and if an unusual number of them occur, an administrator should be notified.

The defaults are:
Time span to detect failures over (seconds)=10 seconds
Number of failures to trigger on=2
Suppression period for reporting=30 seconds
22. The settings mean that any 2 failures by a user within 10 seconds will cause an alert to be generated, and duplicate alerts that occur within 30 seconds will not be reported.
22. It is not an uncommon occurrence for a user to mistype a password when attempting to login. By modifying the values, this template can be customized to local user behavior.

Repeated Failed su Commands Template

The repeated failed su template monitors failed attempts to change UIDs. After a threshold of failures occur, it generates an alert.

This template collects information from /var/adm/sulog. This log is used to detect failed su attempts.

The repeated failed su template is useful because the system binary su (which stands for Set User) allows one user to assume the permissions/identity of another user by giving the correct password. One way to try and gain privileges on a system is by making guesses as to what the root password is. This template will detect such attacks.

The defaults are:
Time span to detect failures over=24 hours
Number of failures to trigger on=2
22. The settings mean that any 2 failures by a user within a day will cause an alert to be generated.
22. In many environments, users do not run the su program frequently, hence the long interval.

Race Condition Attacks Template

The race condition template monitors the file accesses that a privileged program makes and generates an alert if a file reference appears to have unexpectedly changed.

The race condition template is useful because there is a class of attacks that utilize the time between a program's check of a file to the time that program utilizes that file. For instance, a mail delivery program might check to see if a file exists before it changes ownership of the file to the intended recipient. If an attacker is able to change the file reference between these two steps, he/she can cause the program to change the ownership of an arbitrary file.

Most of these attacks require the attacker to have a local account on the machine being monitored.

The default list of users being monitored are:
0—root
1—daemon
2—bin
3—sys
4—adm
5—uucp
9—lp
11—nuucp This represents the default set of "privileged" user accounts on a particular system. Removing any of these (especially UID 0) means that an attack against one of those users will not be detected by this template.

It would be wise to add in the UID for ids based on the local numbering convention.

The default value for the property "How many paths to keep track of per process" is 20. This is the number of file accesses to store per process. A larger number gives the template a larger view of user actions. However, a larger number will slow down the response speed of the template as well as increase the memory requirements.

If the user needs the special instance where memory needed may grow unbounded, set this value to 0. In this case, potentially all accesses will be stored. In extreme cases, this may cause this template to exhaust all available memory when all accesses are stored.

Buffer Overflow Attacks Template

The buffer overflow attack template watches the execution of SUID binaries. An SUID binary is an executable that runs with the access permissions of the file's owner instead of those of the user invoking the program.

The template monitors for the following actions:
SUID programs executing programs other than themselves (commonly seen in local root exploits).
A program "unexpectedly" gaining UID=0 privileges.
This template uses kernel audit data generated by the IDS set of kernel patches.

The SUID template is useful because an SUID file is one that if executed will operate with the permissions of the owner of the file, not of the person executing the file. One of the methods used to gain privileges on a machine is to gain access to a normal user account, and then exploit a buffer overflow condition to gain higher access.

The default list of users being monitored are:
0—root
1—daemon
2—bin
3—sys
4—adm
5—uucp
9—lp
11—nuucp This list should contain those users that you consider to have elevated access to the system. Only programs that set the user ID to one of the listed numbers will be monitored by this template.

In general, the user should add the UIDs of other privileged accounts to the list (e.g., Webmaster, News Administrator, etc.) and not remove any of the defaults.

Modification of Another User's Files Template

The modification of another user's files monitors users access of files and generates an alert when a user modifies a file owned by someone else.

The modification of another user's files template does not examine the actual disk I/O that takes place. It will generate alerts if someone is capable of modifying the data.

This template uses kernel audit data generated by the IDS set of kernel patches.

The modification of another user's files template is useful because in many environments, users are expected to only be working with their own files. Someone attempting to compromise the security of the machine might cause a system program to modify various files on the system. Since many daemons run as a particular user, this template may generate a notice when such an attack occurs.

The defaults are:

All of the fields are empty initially. These will need to be configured based on the individual machine configuration and usage.

Ignore changes to these files: Adding files to this list allows specific files to be modified without generating alerts. These need to have exact, full pathnames.

Ignore changes to these directories: Adding directories to this permits anything in or below that directory to be modified without generating an alert. These should be full pathnames, but need not be exact. For instance "/tmp/a" will match "/tmp/apple". If you want to specify a specific directory, be sure to append a trailing "/".

List of user Ids to ignore: Adding user ID numbers to this list will cause those users to be ignored by this template. It is recommended that this be left blank unless specifically needed.

Monitor for the Start of Interactive Sessions Template

The monitor for the start of interactive sessions template monitors for the start of interactive user sessions. This includes ftp sessions, remote logins, and using the su command to switch to another user ID.

This template collects information from /var/adm/sulog, and /var/adm/wtmp. Note that wtmp will not be created by the login programs, so be sure that it exists if you wish this template to function properly.

The monitor for the start of interactive sessions template is useful because there are certain user accounts that are intended to be used by system programs or only for maintenance purposes. Therefore, it is useful to be notified if anyone begins an interactive session using one of those user names.

There is a default list of users supplied. These should be changed if you use a different naming convention, and any additional non-user accounts should also be added in. The following shows what the default accounts are normally used for:

| | |
|---|---|
| root | Superuser - system maintenance |
| ids | Praesidium IDS/9000 maintenance |
| www | Web Server maintenance |
| news | News maintenance |

The rest are usually never logged into directly, and are used for the execution of some services:

daemon
bin
sys
adm
uucp
nuucp
hpdp

Monitor Logins/Logouts Template

The monitor logins/logouts template monitors for users logging in or logging out of the system.

This template collects information from /var/adm/wtmp. Note that wtmp will not be created by the login programs, so be sure that it exists if you wish this template to function properly.

The monitor logins/logouts template is useful because in certain environments, and at certain times, no (or only selected) users are expected to be accessing the system remotely. This template will alert you at the start and end of connections by all users except for ones you specifically indicate to ignore.

The default list of users to ignore is empty. The user configuration will change depending on how this template is deployed. By adding a user name to the list, no alert will be generated when that user logs in or out.

For example, on a database server, the user might only have user "dbmaint" logging in during a specified range of hours. No other users are expected to be using the system. You could build a surveillance schedule that ignored user "dbmaint" during the expected hours, and would watch everyone otherwise.

Other machines might only be used during business hours, so this template can be deployed during non-business hours to report on any connections.

The following list maps the Code values to the name of the detection template that generates them.

| Code Detection Template |
|---|
| 5 Buffer overflow attacks |
| 6 Race condition attacks |
| 9 Creation of SetUID files |
| 13 Creation of world-writable files |
| 15 Repeated failed su commands |
| 16 Repeated failed logins |
| 27 Modification of files/directories |
| 28 Changes to log files |
| 29 Modification of another user's files |
| 30 Monitor start of interactive sessions |
| 31 Monitor logins/logouts |

The following list maps the Message values to the name of the detection template that generates them.

Message Detection Template
Append-only file being modified
Changes to log files
Failed login attempts
Repeated failed logins
Filename mapping change
   Race condition attacks
   Filesystem change detected
   Modification of files/directories
Login: "USERNAME"
   Monitor logins/logouts
Logout: "USERNAME"
   Monitor logins/logouts
Multiple failed su attempts by FROM_USER
   Repeated failed su commands
Non-owned file being modified
   Modification of another user's files
Potential buffer overflow
   Buffer overflow attacks
Setuid file created
   Creation of SetUID files
Successful su detected
   Monitor start of interactive sessions
Unexpected change in privilege
   Buffer overflow attacks
User login detected
   Monitor start of interactive sessions World-writable file created
  Creation of world-writable files Detailed Detection Templates
  This section gives details for the detection templates that are summarized above.
5: Buffer Overflow Attacks
Unexpected Change in Privilege
Code: 5
Version: 1
Severity: 1—Critical
Source: User ID: UID
Target Subsystem: 14:PROCESSES
Time: YYYYMMDDhhmmss
Message: Unexpected change in privilege
Details: Unexpected change in privilege detected with
UID: UID(GID: GID) EUID: EUID(EGID: EGID) executing BINARY1 with arguments ARGLIST1 and
system call SYSCALL
where: UID Current User ID of the attacked process
GID Current Effective User ID of the attacked process
EUID Current Group ID of the attacked process
EGID Current Effective Group ID of the attacked process
PID Process ID of the attacked process
BINARY1 Name of program being attacked
SYSCALL System call involved in the attack
ARGLIST1 Arguments passed to BINARY1

Potential Buffer Overflow
Code: 5
Version: 1
Severity: 1—Critical
Source: User ID: UID
Target Subsystem: 14:PROCESSES
Time: YYYYMMDDhhmmss
Message: Potential buffer overflow
Details: Potential buffer overflow detected with
UID: UID(GID: GID) EUID: EUID(EGID: EGID) executing BINARY1 with arguments ARGLIST1 now executing: BINARY2 with arguments ARGLIST2 as PID: PID
where: UID Current User ID of the attacked process
GID Current Effective User ID of the atacked process
EUID Current Group ID of the attacked process
EGID Current Effective Group ID of the attacked process
PID Process ID of the attacked process
BINARY1 Name of program being attacked
SYSCALL System call involved in the attack
ARGLIST1 Arguments passed to BINARY1
BINARY2 Name of new program being invoked
ARGLIST2 Arguments passed to BINARY2
6: Race Condition Attacks Filename Mapping Change
Code: 6
Appendix D 163
Version: 1
Severity: 1—Critical
Source: User ID: UID
Target Subsystem: 02:FILESYSTEM
Time: YYYYMMDDhhmmss
Message: Filename mapping change
Details: UID: UID (EUID: EUID)
Reference: PATHARG currently kern_SYSCALL1:PATH1 (FILEINFO1) was kern_SYSCALL2:PATH2 (FILEINFO2) program running is PATH3(FILEINFO3) with arguments [ARGLIST3]
ATTACKER was UID: A_UID running PATH4(FILEINFO4) with arguments [ARGLIST4]
where: UID Target's User ID
EUID Target's Effective User ID
PATHARG Symbolic pathname supplied by program
SYSCALL1 Name of system call currently being executed
PATH1 Absolute path of PATHARG as seen by SYSCALL1
FILEINFO1 Type, Inode, and Device number of PATH1
SYSCALL2 Name of previous system call using PATHARG
PATH2 Absolute path of PATHARG as seen by SYSCALL2
FILEINFO2 Type, Inode, and Device number of PATH2
PATH3 Absolute path of target program
FILEINFO3 Type, Inode, and Device number of PATH3
Appendix D 164
ARGLIST3 Comma separated list of arguments used when PATH3 was invoked
A_UID The User ID of the Attacker
PATH4 Absolute path of the attacking program
FILEINFO4 Type, Inode, and Device number of PATH4
ARGLIST4 Comma separated list of arguments used when PATH4 was invoked
9: Creation of SetUID Files
Setuid File Created
Code: 9
Version: 1
Severity: 1—Critical
Source: User ID: UID
Target Subsystem: 02:FILESYSTEM
Time: YYYYMMDDhhmmss
Message: Setuid file created
Details: User UID enabled the setuid bit on file PATH1 executing PATH2(FILEINFO2) with arguments ARGLIST2 as PID: PID where: UID Attacker's User ID number
PATH1 Absolute path to the file being attacked
PATH2 Absolute path of attacking executable
FILEINFO2 Type, inode, and device number of PATH2
ARGLIST2 Comma-separated list of arguments used when PATH2 was invoked
PID Process ID of program PATH1
Example: User 0 enabled the setuid bit on file "/etc/xxx" executing /usr/bin/chmod(1,2093,"40000005") with arguments ["chmod", "u+xs", "/etc/xxx"] as
PID:2216
13: Creation of World-writable Files
World-Writable File Created
Code: 13
Version: 1
Severity: 3—Alert
Source: User ID: UID
Target Subsystem: 02:FILESYSTEM
Time: YYYYMMDDhhmmss
Message: World-writable file created
Details: User UID ACTION FILENAME DESCRIPTION executing PATH1(FILEINFO1) with arguments ARGLIST1 as PID: PID
where: UID User ID number of the attacker
ACTION One of the following strings:
created
made file
FILENAME Absolute path to file affected
DESCRIPTION One of the following messages:
owned by UID: FILE_UID world
writable
with world writable
permissions
FILE_UID User ID number of the owner of FILENAME
PATH1 Absolute path of attacking executable
FILEINFO1 Type, Inode, and Device number of PATH 1
Appendix D 166

ARGLIST1 Comma separated list of arguments used when PATH1 was invoked
PID Process ID of program PATH1
Example: User 0 created "/etc/xxx" with world-writable permissions executing /usr/bin/touch(1,27,"40000005") with arguments ["touch", "/etc/xxx"] as PID:2213
15: Repeated Failed Su Commands
Multiple Failed Su Attempts by FROMUSER
Code: 15
Version: 1
Severity:
3—Alert
2—Severe, for ids or root
Source: User: FROMUSER
Target Subsystem: 05:LOGIN
Time: YYYYMMDDhhmmss
Message: Multiple failed Su attempts by FROMUSER
Details: User "FROMUSER" had at least MAXCOUNT failed su attempts in the past TIME. Targets included USERLIST
where: FROMUSER The user issuing the su command. Note that this is the original login account, and might not reflect a past successful su attempt.
TOUSER The account that FROMUSER is attempting to access
MAXCOUNT The configurable number of attempts permitted before alarm
TIME The configurable time window in which attempts are observed
USERLIST A list of all accounts to which they attempted to switch to in the interval
Example: User "ids" had at least 2 failed su attempts in the past 24 h. Targets included ["root"]
16: Repeated Failed Logins
Failed Login Attempts
Code: 16
Version: 1
Severity:
3—Alert
2—Severe, for ids or root
Source: IP: IP
Target Subsystem: 05:LOGIN
Time: YYYYMMDDhhmmss
Message: Failed login attempts
Details: More than LIMIT failed logins by user USER (REMOTE: HOST IP)
where: LIMIT Maximum number of failures to permit before alert
USER User name attempting to login
HOST Remote host initiating the connection
IP IP address for HOST
Example: More than 2 failed logins by user root (REMOTE: machine.hp.com 127.0.0.1)
27: Modification of Files or Directories
Filesystem Change Detected
Code: 27
Version: 1
Severity: 3—Alert
2—Severe, if file is truncated, deleted, modified, renamed
Source: User ID: UID
Target Subsystem: 02:FILESYSTEM
Time: YYYYMMDDhhmmss
Message: Filesystem change detected
Details: User UID ACTION FILENAME executing PATH1 (FILEINFO1) with arguments ARGLIST1 as PID: PID
where: UID User ID number of attacker ACTION Describes the action the attacker performed:
22. changed the owner of
22. changed the permissions of
22. created a symbolic link
22. created as a hard link
22. created the directory
22. created the file (and overwrote any existing file) named
22. deleted the directory
22. deleted the file
22. opened for modification/truncation
22. performed kern_SYSCALL on the file
22. renamed a file to
22. renamed the file
22. truncated the file
FILENAME Name of the file being modified
PATH1 Absolute path of attacking executable
FILEINFO1 Type, inode, and device number of PATH1
ARGLIST1 Comma separated list of arguments used when PATH1 was invoked
PID Process ID of program PATH1
Example: User 0 created the file (and overwrote any existing file) named "/etc/passwd" executing /usr/bin/vi(1,14665, "40000005") with arguments ["vi", "/etc/passwd"] as PID:2220
28: Changes to Log Files
Append-Only File Being Modified
Code: 28
Version: 1
Severity: 2—Severe
Source: User ID: UID
Target Subsystem: 02:FILESYSTEM
Time: YYYYMMDDhhmmss
Details: User UID ACTION FILENAME executing PATH1(FILEINFO1) with arguments ARGLIST1 as PID: PID
where: UID Attacker's UID
ACTION One of the following actions:
22. created a symbolic link
22. created as a hard link
22. created the directory
22. created the file (and overwrote any existing file named)
22. deleted the file
22. opened for modification/truncation
22. renamed a file to
   22. renamed the file
   22. truncated the file
FILENAME File that was modified
PATH1 Absolute path of attacking executable
FILEINFO1 Type, inode, and device number of PATH1
ARGLIST1 Comma-separated list of arguments used when PATH1 was invoked
PID Process ID of program PATH1
Examples: User 0 created the file (and overwrote any existing file) named "/var/adm/sulog" executing /usr/bin/vi(1,14665,"40000005") with arguments ["vi", "/var/adm/sulog"] as PID:2232
User 0 renamed the file "/var/adm/wtmp" executing /usr/bin/mv(1,2117,"40000005") with arguments ["mv", "wtmp", "wtmp2"] as PID:2209 User 0 renamed a file to "/var/adm/wtmp" executing /usr/bin/mv(1,2117, "40000005") with arguments ["mv", "wtmp2", "wtmp"] as PID:2211
29: Modification of Another User's Files
Non-Owned File Being Modified
Code: 29
Version: 1
Severity: 3—Alert 2—Severe, if file is truncated, deleted, modified, renamed
Source: User ID: UID
Target Subsystem: 02:FILESYSTEM
Time: YYYYMMDDhhmmss
Message: Non-owned file being modified
Details: User UID ACTION FILENAME owned by UID: UID2 executing PATH1(FILEINFO1) with arguments ARGLIST1 as PID: PID
where: UID User ID number of attacker
ACTION Describes the action the attacker performed:
22. changed the owner of
22. changed the permissions of
22. created a symbolic link
22. created as a hard link
22. created the directory
22. created the file (and overwrote any existing file) named
22. deleted the directory
22. deleted the file
22. opened for modification/truncation
22. performed kern_SYSCALL on the file
22. renamed a file to
22. renamed the file
22. truncated the file
FILENAME Name of the file being modified
UID2 User ID number of owner of file being modified
PATH1 Absolute path of attacking executable
FILEINFO1 Type, Inode, and Device number of PATH1
ARGLIST1 Comma separated list of arguments used when PATH1 was invoked
PID Process ID of program PATH1
30: Monitor Start of Interactive Sessions User Login Detected
Code: 30
Version: 1
Severity: 3—Alert
2—Severe, for ids or root
Source: IP: NETADDR
Target Subsystem: 05:LOGIN
Time: YYYYMMDDhhmmss
Message: User login detected
Details: User "USERNAME" logged in on DEVICE (Remote:
NETADDR HOSTNAME)
where: USERNAME Name of the user logging in
DEVICE Device (tty or service) for the connection
NETADDR Network address of remote connection (dotted decimal)
HOSTNAME Truncated hostname of NETADDR
Example: User "root" logged in on pts/3
(Remote:127.0.0.1 machine.hp.com)
Successful Su Detected
Code: 30
Version: 1
Severity: 3—Alert
2—Severe, for ids or root
Source: User: FROMUSER
Target Subsystem: 05:LOGIN
Time: YYYYMMDDhhmmss
Message: Successful su detected
Details: User "FROMUSER" switched to user "TOUSER" on DEVICE
where: FROMUSER Name of the user changing login
TOUSER Name of the user FROMUSER is becoming
DEVICE Device associated with this connection
USERNAME Name of the user logging in
DEVICE Device (tty or service) for the connection
NETADDR Network address of remote connection (dotted decimal)
HOSTNAME Truncated hostname of NETADDR
Examples: User "root" switched to user "ids" on 2
User "root" switched to user "root" on 2
31: Monitor Logins and Logouts
Login: "USERNAME", Logout: "USERNAME"
Code: 31
Version: 1
Severity:
3—Alert
2—Severe, for ids or root
Source: IP: NETADDR
Target Subsystem: 05:LOGIN
Time: YYYYMMDDhhmmss
Message: Login: "USERNAME"
Logout: "USERNAME"
Details: User "USERNAME" ACTION on DEVICE (Remote: NETADDR HOSTNAME)
where: USERNAME Name of the user logging in
ACTION Logged in/out
DEVICE Device (tty or service) for the connection
NETADDR Network address of remote connection (dotted decimal)
HOSTNAME Truncated hostname of NETADDR
Example: User "root" logged in on pts/3 (Remote: 127.0.0.1 machine.hp.com)

Virus Protection

Virus exhibits many of the same characteristics of a host-based attack and so the IDSSO according to the present invention provides a second tier virus protection. Virus protection software operates by searching (in one form or another) for known virus codes within system, application, or data files, or in data coming in via the network. Sometimes the viral code sequences can be removed (the file is "repaired"), other times an alert is provided and activity related to that file is blocked. Such virus protection schemes are completely ineffective against new and unknown virus codes, or against viruses whose codes have not been added to the published list of known viruses.

A host-based IDS can also provide second-tier virus protection: All current virus protection software operates by searching in one form or another for known virus codes within system, application, or data files or in data coming in via the network. Sometimes the viral code sequences can be removed (the file is "repaired"), other times an alert is provided and activity related to that file is blocked. Such virus protection schemes are completely ineffective against new and unknown virus codes, against viruses whose codes have not been added to the published library of known viruses and against "polymorphic" viruses that alter their own codes as they propagate.

However, in order for a virus to propagate it almost always has to replicate itself into data or program files for which it does not usually have legitimate access. This sort of activity is exactly what is flagged by a host-based intrusion detection system monitoring for system misuse. Thus, the host-based IDS 50 may alert system administrators against certain viral propagation activities from heretofore unknown viruses that easily traverse the filters of the virus protection system(s).

Furthermore, the host-based IDS 50 may provide an alert even if a successfully propagated virus code attempts to do damage to local system or data files. However, if a virus has gotten this far, it has usually infected a process that has legitimate access to the data being damaged and would not generally be detected as system misuse.

Alert Message Output

The templates (circuits) in the correlator will generate an ASCII text message if an intrusion is detected. The event must be sent from the correlator 220 to the outside world, which is the idsagent 200. Remember, the correlator process idscor 230 is executing as a single thread, so the only way to asynchronously read an output event from the engine core is to define a callback function. The callback function is called by the engine core whenever it wishes to send an event to the outside world.

Interfacing to the ECS Engine Core

At the heart of the correlator lies the ECS correlator core which controls the engine.

Engine Initialization—CORE_engineInitialize

The engine needs some basic initialization steps performed before it can start. One of the first steps is to initialize a trace and logging buffer. These buffers are used to generate log or trace messages by the engine core. The trace mask based is set on the value of the -t command line argument. A value of −1 will turn on full tracing, which generates a huge amount of trace data in the log file. The user can select what elements of the ECS engine core operation to trace using the tracing value as a bit mask.

The engine core needs to load an MDL file which specifies the format and layout of all events that the engine must deal with. The mdlFile global is set from the environment variables created when the idscor process 130 is started. It specifies the location of the mdl file, which should be in /opt/ids/lib/mdl.md by default. The ECS_MDL_MD environment variable is created for further use by the engine. However, the ECS engine does not load the MDL file directly. Instead it loads a file which contains a line that specifies the full path to the shared libraries for all the endecoders it must load.

Some scratchpad space is created for the engine to work with, and the engine's internal time is set. We set the internal engine instance variable to 1 to indicate that this is the first (and only) engine instance in this process. Up to 8 engine instances can be supported simultaneously, but we only run one instance in the idscor process.

The circuits are loaded by command calls into the ECS engine. The commands are ASCII strings with certain fields parameterized. For example, the load datastore function needs two parameters: the data store name and the path to the data store file. Passing these two parameters into a macro will result in a correctly formed command string for the engine core. These commands are passed into strings of a command tuple opaque data type for the ECS engine core. Finally, the ECS API function will execute the command.

Loading and Unload Circuits

The correlator loads and unloads templates (circuits) in response to commands from the idsagent process 110.

A group of templates is loaded which form a surveillance group defined in the GUI. The command from the idsagent 110 is in the form of an ASCII string, with the parameters to the command separated by spaces. The comment block on this function is detailed enough to explain what it does. If one of the templates fails to load, then all of the templates are unloaded. Each circuit to be loaded is specified as a name in the parameter list. The idscor 130 will load the circuit using the circuit name. For simplicity the idscor 130 assumes that each circuit to be loaded has an associated data and fact store. So the sequence of steps to load a template group are (for each circuit specified in the group):

1. Create the data store name based on the circuit name.
2. Load the data store into the engine.
3. Create the fact store name based on the circuit name.
4. Load the fact store into the engine.
5. Create the full path to the circuit to load.
6. Load the circuit, and associate it with the data and fact stores which were just loaded. Any data/fact store references from the circuit will be directed to these data/fact stores.
7. Enable the circuit—it will now accept input events from the engine.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A computer architecture for an intrusion detection system, comprising:
    a control agent to interface with a management system and to monitor system activity;
    at least one data gathering component which gathers kernel audit data and syslog data;
    at least one correlator to interpret and analyzes the kernel audit data and the syslog data using at least one detection template,
    wherein said at least one correlator uses an event driven correlation using an Event Correlation Services (ECS) engine core,
    wherein said at least one detection template is selected from the group including:
    a modification of files/directories template;
    a chance to log files template;
    a SetUID files template;
    a creation of world-writables template;
    a repeated failed logins template;
    a repeated failed SU commands template;
    a race conditions attack template;
    a buffer overflow attacks template;
    a modification of another user's file template;
    a monitor for the start of interactive sessions template; and
    a monitor logins/logouts template.

2. The computer architecture of claim 1, wherein said intrusion detection system is host-based.

3. The computer architecture of claim 1, wherein said detection templates are configured into surveillance groups and into surveillance schedules.

4. The computer architecture of claim 1, wherein said management system includes a graphical user interface.

5. The computer architecture of claim 4, further comprising a communication agent which encrypts information sent from said intrusion detection system to said management system.

6. The computer architecture of claim 1, wherein there is low bandwidth connection between said control agent and each of said data gathering components and said at least one correlator and a high bandwidth connection between said control agent and each said data gathering component and said correlator.

7. The computer architecture of claim 1, wherein said correlator uses a meta-description language.

8. The computer architecture of claim 6, wherein said high bandwidth connection is used to send and receive memory-mapped files.

9. The computer architecture of claim 1, wherein said data gathering component includes a kernel audit record component and a syslog component.

10. The computer architecture of claim 9, wherein said data gathering component and said syslog component convert gathered data into an ASCII format.

11. The computer architecture of claim 1, further comprising a notification log and a response script connected to said control agent.

12. The computer architecture of claim 1, further comprising an installed bits file connected to said control agent.

13. The computer architecture of claim 1, wherein the management system controls more than one control agent each residing on a different computer.

14. The computer architecture of claim 1, wherein said control agent communicates with said management system across a secure communications link.

15. The computer architecture of claim 1, wherein if the correlator detects an intrusion an alert will be sent to the management system and a potential intrusion alert record will be logged to a notification file.

16. The computer architecture of claim 1, wherein said at least one data gathering component includes a buffer.

17. A computer architecture for detecting intrusions, comprising:
   reading means for reading kernel records;
   reformatting means for reformatting each of the read kernel records into a different format;
   parsing means for parsing the records and comparing the parsed records against one or more templates using an event driven correlation, wherein the event driven correlation uses an Event Correlation Services (ECS) engine core, wherein the at least one template is selected from the group including:
   a modification of files/directories template;
   a chance to log files template;
   a SetUID files template;
   a creation of world-writables templates;
   a repeated failed logins template;
   a repeated failed SU commands template;
   a race conditions attack template;
   a buffer overflow attacks templates;
   a modification of another user's file templates;
   a monitor for the start of interactive sessions template; and
   a monitor logins/logouts template.

18. A computer system, comprising:
   a processor; and
   a memory coupled to said processor, the memory having stored therein sequences of instructions, which, when executed by said processor, causes said processor to perform the steps of
   reading means for reading kernel records;
   reformatting means for reformatting each of the read kernel records into a different format;
   parsing means for parsing the records and comparing the parsed records against one or more templates using an event driven correlation,
   wherein the at least one template is selected from the group including:
   a modification of files/directories template;
   a chance to log files template;
   a SetUID files template;
   a creation of world-writables template;
   a repeated failed logins templates;
   a repeated failed SU commands template;
   a race conditions attack template;
   a buffer overflow attacks templates;
   a modification of another user's file templates;
   a monitor for the start of interactive sessions template; and
   a monitor logins/logouts template,
   wherein said event driven correlation uses an Event Correlation Services (ECS) engine core.

19. The computer system of claim 18, wherein said ECS engine core operates using an event driven model.

* * * * *

UNITED STATES PATENT AND TRADEMARK OFFICE
CERTIFICATE OF CORRECTION

PATENT NO. : 7,007,301 B2  
APPLICATION NO. : 09/878320  
DATED : February 28, 2006  
INVENTOR(S) : Mark Crosbie et al.

Page 1 of 1

It is certified that error appears in the above-identified patent and that said Letters Patent is hereby corrected as shown below:

In column 25, line 57, below "uucp" insert -- 1p --.

In column 35, line 41, in Claim 17, delete "templates;" and insert -- template; --, therefor.

In column 36, line 4, in Claim 17, delete "templates;" and insert -- template; --, therefor.

In column 36, line 5, in Claim 17, delete "templates;" and insert -- template; --, therefor.

In column 36, line 28, in Claim 18, delete "templates;" and insert -- template; --, therefor.

In column 36, line 31, in Claim 18, delete "templates;" and insert -- template; --, therefor.

In column 36, line 32, in Claim 18, delete "templates;" and insert -- template; --, therefor.

Signed and Sealed this

Twenty-eighth Day of July, 2009

JOHN DOLL  
*Acting Director of the United States Patent and Trademark Office*